US005617578A

United States Patent [19]
Kroll et al.

[11] Patent Number: 5,617,578
[45] Date of Patent: Apr. 1, 1997

[54] COMPUTER-BASED WORKSTATION FOR GENERATION OF LOGIC DIAGRAMS FROM NATURAL LANGUAGE TEXT STRUCTURED BY THE INSERTION OF SCRIPT SYMBOLS

[75] Inventors: Yury Kroll; Vadim M. Yasinovsky, both of Brookline; Adam B. Green, Lexington, all of Mass.

[73] Assignee: SPSS Corp., Chicago, Ill.

[21] Appl. No.: 655,665

[22] Filed: Jun. 3, 1996

Related U.S. Application Data

[63] Continuation of Ser. No. 301,480, Sep. 8, 1994, abandoned, which is a continuation of Ser. No. 545,341, Jun. 26, 1990, abandoned.

[51] Int. Cl.[6] ............................................. G06F 15/62
[52] U.S. Cl. .................. 395/800; 395/143; 364/DIG. 1; 364/274; 364/282.1
[58] Field of Search ............................. 395/800, 140, 395/141, 147, 600, 12, 159, 160, 143

[56] References Cited

U.S. PATENT DOCUMENTS

| 3,781,814 | 12/1973 | Deerfield | 395/375 |
|---|---|---|---|
| 4,546,435 | 10/1985 | Herbert et al. | 364/200 |
| 4,695,975 | 9/1987 | Bedrij | 395/147 |
| 4,723,210 | 2/1988 | Barker et al. | 395/147 |
| 4,811,241 | 3/1989 | Liang | 395/144 |
| 4,872,167 | 10/1989 | Maezawa et al. | 371/19 |
| 4,875,187 | 10/1989 | Smith | 395/141 |
| 4,891,770 | 1/1990 | Hollett | 395/141 |
| 4,979,109 | 12/1990 | Tanaka et al. | 364/200 |
| 5,005,136 | 4/1991 | Van Berkel et al. | 364/490 |
| 5,113,492 | 5/1992 | Ariki et al. | 395/147 |

OTHER PUBLICATIONS

Interactive EasyFlow Manual, Haven Tree Software Limited, 1987, pp. (4–1)–(4–71).
Giovanni Perrone, "dBASE tool CLEARs way for automatic flowchart generation", PC Week V5; n3; Jan. 19, 1988; pp. 69–70.
Barron D. W., Text Processing and Typesetting with UNIX, Addison–Wesley Publishing Company, Sep. 30, 1987, pp. 3–11, 36–42, 285–288.
"Automatically Generating Visual Syntax–Directed Editors", Areji et al. Communications of the ACM, Mar. 1990, vol. 33 No. 3 pp. 349–360.

*Primary Examiner*—Mehmet B. Geckil
*Attorney, Agent, or Firm*—Choate, Hall & Stewart

[57] ABSTRACT

A computer-based workstation for logical diagram generation from structured text written in any natural language is disclosed. With the invention, a user can quickly indicate the logical structure of a text in computer memory using a prescribed set of symbols, instruct the computer to generate a logical digram corresponding to the text, and finally to interactively view and edit the diagram. A user is therefore able to describe in both words and graphical images a procedure or set of instructions.

5 Claims, 4 Drawing Sheets

COMPUTER-BASED WORKSTATION FOR GENERATION OF LOGIC DIAGRAMS FROM NATURAL LANGUAGE TEXT STRUCTURED BY THE INSERTION OF SCRIPT SYMBOLS

This is a continuation of application Ser. No. 08/301,480, filed on Sep. 8, 1994, now abandoned, which is a continuation of Ser. No. 07/545,341, filed on Jun. 26, 1990, now abandoned.

BACKGROUND OF THE INVENTION

This invention relates to computer-generated diagrams.

The difficulty in explaining a procedure with normal text is that the reader is forced to understand the micro level of individual steps as well as the macro level of the entire process. Very little aid is given by the visual representation of the text itself. A reader who is interested in just one logical thread must read the whole text and ignore the parts that do not relate directly to the selected logical sequence. This is the main reason why any process description, in instructions, manuals, and so on, is much more understandable when it is done in the form of a diagram.

Logic diagrams of natural text are widely useful, yet time-consuming to create by hand. Therefore, a great need exists for a computer-based system for logic diagram generation.

In order to computer-generate logic diagrams corresponding to a text, the logical structure must be evident to the device performing the task. The starting point of the present invention was a series of commercial products named CLEAR+™ which were developed by the present inventors to generate logic diagrams for computer code written in various high-level computer languages, which formally define all logical structures. Natural languages, however, do not formally define all logical structures, especially when the structures are nested.

The present invention provides a computer-based workstation where a user can quickly indicate the logical structure of a text in computer memory written in any natural language using a prescribed set of symbols, instruct the computer to generate a logic diagram corresponding to the text, and finally to interactively view and edit the diagram to suit the application at hand.

SUMMARY OF THE INVENTION

The present invention is a computer-based workstation which extracts the logical structures from a source text, and presents them in the form of a logic diagram.

The source text, for which generation of a corresponding logic diagram is desired, is entered or read into the workstation using an input device. Then the text must be structured, that is, the start and end of all logical constructs in the text must be indicated. Logical constructs include statement, alternative, multiple choice, tree, redirection, repetition, and stop. According to the present invention, the logical constructs in the source text are indicated using a 'script' language, which consists of a set of 'script' symbols along with syntax rules for combining these symbols with the source text. The source text structured using the script language is called a 'script'.

The workstation processes the script and generates a data structure which defines the logical connections between all lexical elements of the source text. Using the data structure and a set of well-specified rules, the workstation selects and positions the output symbols of the logic diagram and then lays out the required connecting lines. In this way, a graphical database is generated which contains all the geometrical elements of the logic diagram corresponding to the source text.

Finally, the workstation, using the graphical database, produces the logic diagram on a requested output device. The present invention allows the user to interactively generate a number of diagrams of different styles, and to choose the best for the task at hand.

By writing a script and then viewing the corresponding logic diagram, a user is able to quickly and precisely describe in both words and graphical images a procedure or set of decision points.

DESCRIPTION OF THE PREFERRED EMBODIMENT

Figure 1:
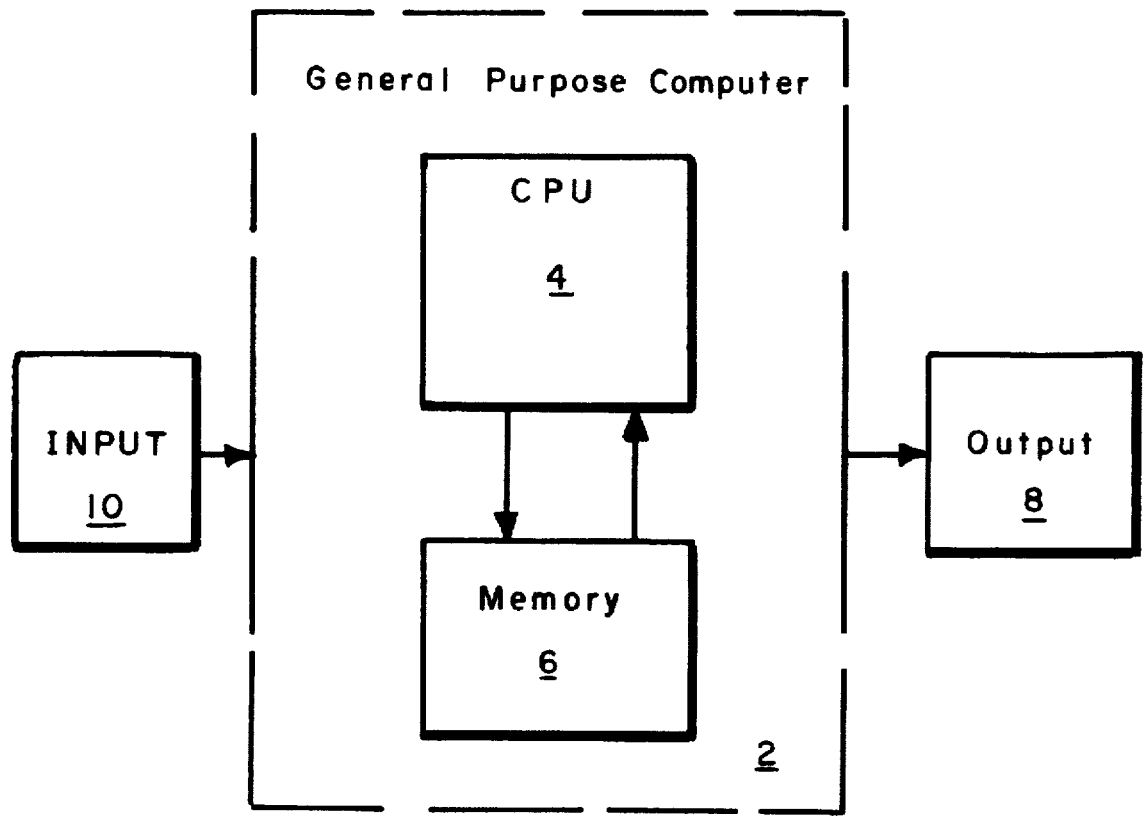
FIG. 1 is a schematic illustration of the computer-based workstation of the present invention.

The computer-based workstation for logic diagram generation according to the present invention is shown schematically in FIG. 1. The workstation includes a general purpose computer 2 with at least one central processing unit 4 and at least one block of memory 6. The computer is under control of automatic system resource management software or an operating system. A graphical output device 8 is provided to produce the generated diagrams. An input apparatus 10 is provided so that the user can edit the source text and interact with the graphical output device.

Figure 2:
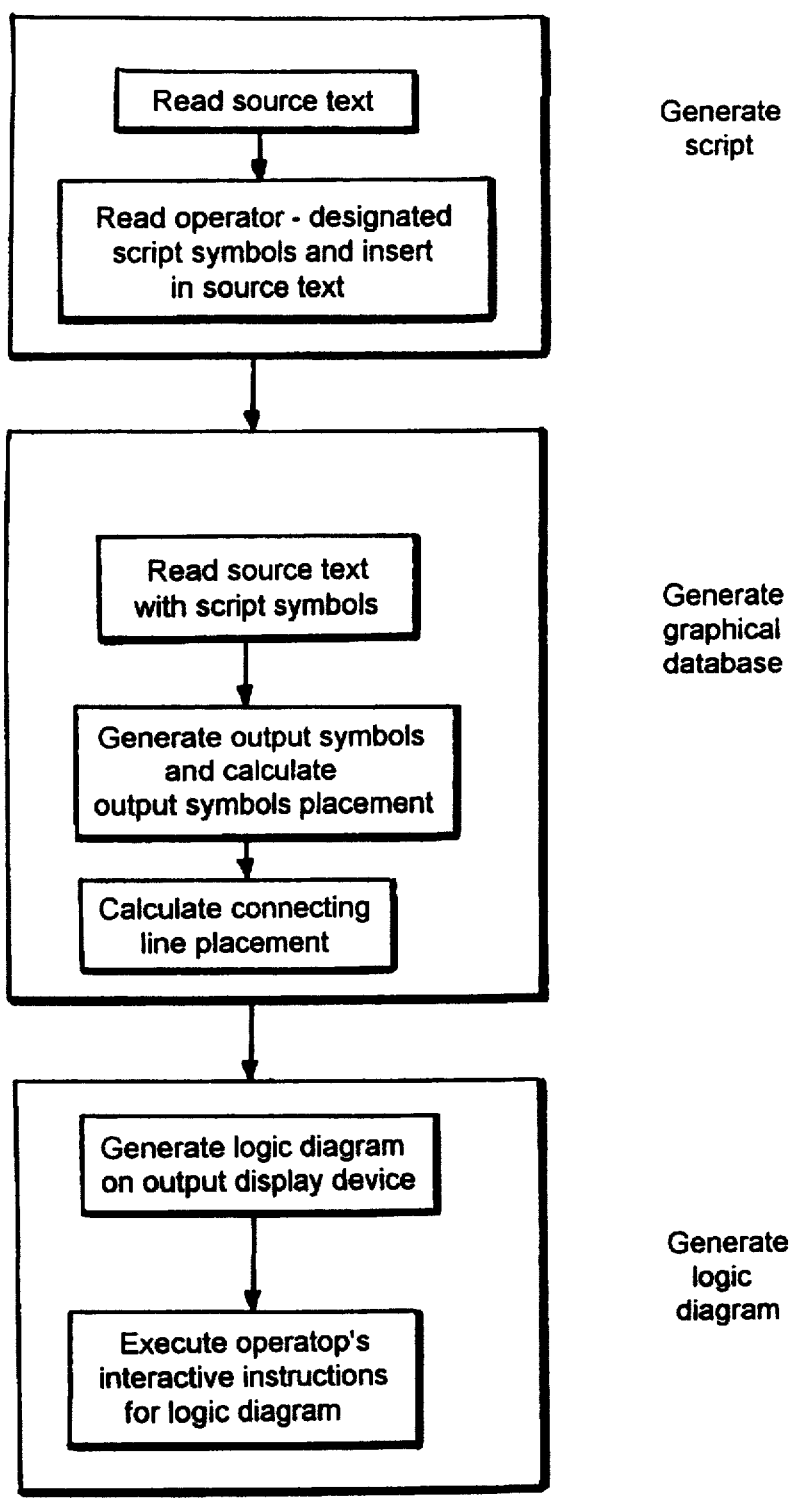
FIG. 2 a flow chart showing the procedures performed by the present invention.

The operation and performance of the workstation, as a source text is converted into a logic diagram, is illustrated in FIG. 2. As indicated, source text is first entered or read into the workstation. Then, the user indicates the logical constructs of the source text using script symbols in accordance with script syntactical rules. This results in a script. Next, output symbol selection and placement is automatically performed by the workstation. This is followed by the placement of connecting lines. The result is a graphical database corresponding to the script. Finally, the logic diagram is automatically generated on an output graphic device. The user may interactively design the final appearance of the logic diagram. The three main steps of the procedure, according to the preferred embodiment of the invention, are described in detail in the next three sections.

1 Script Generation

Since current state-of-the art computers are unable to structure the logic of natural language, an artificial means for doing so is required. According to the present invention, a script language is used to indicate the logical constructs in a given input text.

1.1 Logical Constructs

The most basic logical construct is the "statement." A statement is a lexical unit consisting of one or more sentences which can be graphically represented as one symbol, logically connected directly to the next logical construct of the text. Oftentimes a statement can be expanded into a sequence of statements, and sequences of statements can always be reduced to a single statement.

The most widely used logical construct of a flow-chart is the "alternative." As a header, the construct uses a condition, usually containing the word "if." The header of an alternative always has two outgoing connections. Depending on whether the condition of the header is true or false, one of two logical branches is selected. The branch corresponding to a false condition usually contains the word "else" or "otherwise." Both branches can include any number of further constructs.

A "multiple choice" is a generalization of an alternative, providing the capability to connect a header with more than two logical branches. All branches can include any number of further constructs.

A "repitition" is a logical construct used mostly in computer programming. It consists of a header with a condition for the repetition and one logical branch that should be repeated until the condition is true. The last statement of the logical branch must have a return connection to the header. Therefore, the header of the construct has two outgoing connections: one goes to the internal logical branch, and the other to the construct following the repetition.

Alternatives, multiple choices, and repetitions can be combined and nested without any limitation in the present invention.

"Redirection" and "stop" are logical constructs with no lexical elements. They are used to change or eliminate a connection. A redirection explicitly defines the starting and ending points of an added logical connection.

A "tree" is a logical construct consisting of at least two lexical units: a header of the tree, and a "subtree", which can in turn be the header of another tree. A tree has no outgoing connections. All logical connections are internal and directed from the header to the subtrees.

1.2 Text Structuring

The ideal situation would be if a plain text could be structured to show its logical constructs by means of the language itself, without any additional operations. But this can only be attained when a computer can achieve a level of comprehension close to the capabilities of the human reader. Even if the start of any logical construct could be defined by the natural means of the language, for example by a keyword, natural language is incapable of providing means for identifying the point of the simultaneous ending of two or more nested logical constructs.

In order to facilitate a computer solution to the problem, a text has to be structured artificially. The simplest resolution of the problem is indentation. If every construct can be identified by a keyword or syntax, and every nested construct is indented relative to any construct containing it, all logical constructs can be unambiguously extracted, and the text can be considered structured. However, a preferable way to solve the problem is the application of special symbols and syntactical rules to provide context-free text structuring. By making the method context free, text in any natural language can be structured by the invention. In fact, the text does not even have to make sense to be structured. This can be helpful in situation where the user wants to 'fool' the system to create unusual diagrams.

A syntax summary and a command reference for a preferred embodiment of a text-structuring language are contained in the Appendix. This language consists of script symbols along with syntactical rules for combining these symbols with text to indicate logical constructs. By adding the required script symbols to a source text, a script file is created. The script therefore contains all lexical units of the source text and their logical connections. This information is all that is needed to construct a logic diagram. The script symbols will determine the output symbols to be used in the logic diagram, control the relative position of the output symbols, and indicate their interconnections. The lexical units will be printed in the output symbols.

As an example of the use of the text-structuring language according to the preferred embodiment, consider the calculation of Adjusted Gross Income as described in Line 31 of the 1988 IRS 1040 form:

Subtract line 30 from line 23. This is your adjusted gross income. If this line is
less than $18,576 and a child lived with you, see "Earned Income Credit" (line 56) on page 19 of the instructions. If you want IRS to figure your tax, see page 16 of the instructions.

The same text with script symbols added becomes a script:

Subtract line 30 from line 23. This is your adjusted gross income.
Less than $18,576 and a child lived with you?
  see "Earned Income Credit" (line 56) on page 19 of the instructions.
?end
You want IRS to figure your tax?
  see page 16 of the instructions.
?end For illustration purposes, the script symbols are shown in bold face type.

According to the preferred embodiment, scripts are kept in standard ASCII text files, a file format which can be produced by the majority of text editor progams available on modern computers. To create a script file, the user types the text into a text editor or starts with an existing text file. Then the user adds script symbols to the text as if they were normal punctuation marks. Finally, the script is saved in a text file.

The script symbols presented in this embodiment are not the only ones possible. Different sets of script symbols could be created for specific purposes, such as for international translations of the present invention. In addition, a hardware system with a graphical user interface could support script symbols made from icons or graphical symbols instead of the current character-based script symbols.

According to the preferred embodiment of the text-structuring language, blank lines and indentation are allowed to make the scripts more readable, but neither affects the output logic diagram. Comments may also be added to a script with the proper script symbols. Procedure names must conform to the naming rules for text files in the computer operating system under which the language is running; this makes it possible for individual procedures to be stored in separate text files. The language does not differentiate between upper and lower case characters in names of procedures, or in script symbols. A script line may be up to 1024 characters in length, including the characters used as script symbols. The end of a script line is marked by a carriage return character followed by a line feed character. This pair of characters is used to mark the end of a paragraph in most modern text editors, allowing these text-editors to display and print a long script line as several word-wrapped lines of text.

The position of a script symbol within a script line is critical in determining its affect on the logic diagram. Some symbols, such as the 'If Begin,' are only recognized by the language if they are the last characters in the script line. Others, such as the 'Output Text' are recognized anywhere within a script line.

Several of the script symbols, such as 'If Begin' and 'If End' are used as matched pairs to mark off a block of several script lines. These pairs of script symbols define block structures. Once a block structure has been opened with a begin script symbol, it must be closed with a matching end script symbol later in the script.

The language allows one pair of block structure commands to be placed within another pair of the same commands or within different block structure commands. This technique is called nesting. The proper pairing of begin and end symbols is required; the inner block structure must be closed before the outer one.

2 Graphical Database Generation

The script of the present invention contains all the lexical units of the source text and their logical connections. This information is all that is required to construct a logic diagram. The script symbols will determine the output symbols to be used in the logic diagram, control the relative position of the output symbols, and indicate their interconnections. The lexical units will be printed in the output symbols.

2.1 Symbol Location

In the present invention, graphical database generation begins with the calculation of the positions of all output symbols which contain the lexical units. The symbols are placed on a (X, Y) grid. The coordinate X increases from left to right and the coordinate Y increases from top to bottom. The method of symbol placement on the grid differs significantly for flow chart type diagrams and for tree chart diagrams, and therefore, the two cases will be described separately.

2.1.1 Flow Chart Type Diagram

A flow chart does not have a pre-defined global structure. The proper heuristic procedure for placing output symbols in a flow chart is to evaluate the global features of the future diagram, and then, based on this, to position symbols according to their local interconnections, so that connecting symbols are positioned as close as possible.

One of the global features of a flow chart is the longest path on a graph. This longest path will define the "backbone" of the future diagram. Another global feature is the multiple choice construct. If a multiple choice exists-in the longest path, the future diagram will be based on a "cross." Finding and positioning the output symbols associated with the backbone and any crosses is the first step of the procedure. If a structure has only a backbone, symbols will be positioned one under another. In the case of a cross, all the subcases of the multiple choice construct join to the backbone as a horizontal chain.

The next part of the procedure is to sweep through all the remaining output symbols, positioning them one at a time until there are no more left. According to the invention, the nearest proper position for each symbol to be connected with one already positioned is found using the following rules:

1. The search for an available position for a new output symbol takes into account only the already positioned symbols. Connecting lines are introduced at the completion of the symbol placement, and it is assumed that the connecting lines can be drawn in the space between the symbols. The only exception occurs for the case of a multiple choice and its subcases, where all the positions directly above all already positioned subcases are not available for a new symbol, as these spaces will later be used for connecting lines to the header.
2. If a new output symbol will have an incoming connection from an already positioned symbol, the new symbol is first attempted to be positioned on the same level as or below the already positioned symbol. If the symbol will have an outgoing connection to an already positioned symbol, the new symbol is first attempted to be positioned on the same level as or above the already positioned symbol.
3. If a new output symbol is the header of a multiple choice construct, it is positioned so as to provide room to position all the subcases horizontally. The entire construct requires at least two levels vertically.
4. If a new output symbol will be connected to an already positioned symbol belonging to the longest path, the new symbol is first attempted to be positioned directly on either side of the already positioned symbol.
5. The search for a proper position for a new output symbol to be connected to an already positioned symbol proceeds in a specified, orderly manner, according to the constructs of the two symbols. For example, in the case of a new symbol to be connected to an already positioned symbol of the backbone with coordinates (X,Y), if the first attempted position (X+1,Y) for a new symbol is not acceptable for some reason, the search for the position proceeds in the following order: (X−1,Y), (X+2,Y), (X−2,Y), then if the search is permitted in the down direction (X+1,Y+1), (X−1,Y+1), and so on.

The rules above leave room for variation. According to the invention, further restrictions can be selectively invoked by the user to achieve desired effects. For example, it is often desireable to require that the two alternative branches of an alternative construct be located on either side of the alternative header. This symbol placement uses a procedure similar to that used in tree charts, the topic of the next section.

2.1.2 Tree Chart Type Diagram

The first step in the location of output symbols for a tree chart is to give all symbols an initial (X, Y) position in such a way that the first symbol of each layer Y=k is assigned to X=1, the next to X=2, etc. The result is that all of the symbols are located on the left side of the grid.

The next step is to move the output symbols to the right in order to make more evident the symbol connections. To do this, every symbol on layer k that has connections with at least one symbol on layer k+1 should be horizontally centered relative to them. Therefore, for every symbol S on all layers besides the last, the following value is calculated:

$$\Delta X = X_k - X_k'$$

In this equation, $X_k$ is the X coordinate of the symbol S on the kth layer, and $X_k'$ is the X coordinate of the middle point of all symbols on the k+1th layer that are connected to the symbol S. $\Delta X$ indicates a shift of symbols according to the following rules. If $\Delta X=0$, no shift is required. If $\Delta X<0$, all symbols on the kth layer, starting from S to the rightmost one, are moved to the right by $-\Delta X$ positions. If $\Delta X>0$, then all the symbols included in the subtrees having as a root all the symbols on the k+1th layer, starting from the leftmost one connected with S to the rightmost one, are moved to the right by $\Delta X$ positions. An exception takes place when all the symbols on the kth layer on the left of the symbol S have no outgoing connections. In this case, instead of moving the subtrees, all the symbols on the kth layer are moved to the right.

The process is repeated for all layers, starting from the next-to-the-last and ending at the top, and for every output symbol on each layer, starting from the left and ending at the right.

Using this procedure, all output symbols can be placed correctly in a straightforward way. However, the result is often overly space-consuming. In accordance with the present invention, the user may selectively invoke variations which result in different styles of the diagram.

2.2 Connecting Lines

The next step in generating the graphical database is the calculation of the layout of the lines connecting the output symbols. For a tree chart, this is quite trivial because all lines go from the bottom of one symbol to the top of the next. The lines cannot intersect and consist of at most three segments. The horizontal sections of 3 segment lines may overlap, but since these segments always have the same direction, no ambiguity will be introduced.

The setting of connecting lines in a flow chart is a more sophisticated procedure. For some pairs of output symbols, the connecting line can have up to five segments. In addition, since connecting lines can go in any direction, special measures must be taken to avoid ambiguity in cases of intersection and/or overlapping.

In the present invention, ambiguity of line intersection is fully eliminated by the use of rounding (or the addition of a 45 degree segment) at every turn of a connecting line. Therefore, intersection of any two connecting lines cannot be interpreted as a change of direction for both of them.

Overlapping problems at the start and end of connecting lines can be resolved by the following rules, which also help illustrate the flow of the logic:

1. Connecting lines cannot come into an output symbol from the bottom or go out from a symbol from the top.
2. The connecting line coming into a header of a multiple choice can only come in from the top of the symbol. For all other output symbols, both lateral sides are also available for incoming and outgoing lines.
3. If during the generation of connecting lines, one of the lateral sides of an output symbol gets used, for an incoming line for example, from that point onward that side of the symbol is not available for outgoing lines.

The above set of rules cannot prevent overlapping altogether. In order to avoid it as much as possible, the present invention employs a special facility. All nonempty rows or columns on the (X, Y) grid have two counters associated with them which calculate the number of intermediate horizontal and vertical segments drawn along the rows or columns on each side of the output symbols. In that way, every next intervening segment can be shifted by a certain number of pixels relative to its ideal position (exactly halfway between two adjacent symbols).

The procedure for the generation of connecting lines evaluates the horizontal (dx) and the vertical (dy) grid distances between every pair of connected output symbols. The connecting lines are then generated using a minimum number of segments and a minimum total line length. The total line length is minimized using the following rules:

1. If dx=0, the length of the horizontal segments of the connecting line is made no greater than one-half of the horizontal distance between adjacent symbols.
2. If dx>0, an attempt is made to connect the sides facing each other.

If |dx|=0 and dy=0, the output symbols are horizontally adjacent, and the connecting line is just a horizontal segment.

If dx=0 and dy=1, the output symbols are vertically adjacent, and the connecting line is just a vertical segment. However, if dx=0 and dy=−1, the connecting line must make a loop to go from the lower symbol to the upper one. The simplest connection in this case starts from a lateral side of the lower symbol, turns up and then ends at the same lateral side of the upper symbol. Therefore, if the corresponding lateral sides of symbols are properly available, the connecting line is a three-segment line with two roundings. If only the bottom side of the lower symbol is available, the connecting line consists of four segments. If, in addition, only the top of the upper symbol is available, the connection line has five segments and four roundings, going out the bottom of the lower symbol and in the top of the upper one.

If |dx|=1 and dy=1, the connecting line has a minimum of two segments. The line can either come out the bottom of the upper output symbol and in the side of the lower one (the horizontal-vertical (H-V) sequence) or come out the side of the upper symbol and in the top of the lower one (the vertical-horizontal (V-H) sequence). According to the invention, the H-V sequence is attempted first. This sequence is only possible if the adjacent position on the grid directly above the lower symbol is free, a condition which is only necessarily true for subcases. If the H-V sequence is not permitted, the V-H sequence is attempted. If this sequence is also not possible, attempts to make a three-segment line (V-H-V or H-V-H) are made, and so on. If |dx|=1 and dy=−1, two-segment lines are not possible. Attempts to build the connecting line start with a three-segment line in this case.

If |dx|>1 and dy=0, the connecting line has a minimum of four segments. The line can either come out of a lateral side and end on a top side in the H-V-H-V sequence, or go out of a bottom side and end on a lateral side in the V-H-V-H sequence. If neither of these are possible, the connecting line has five segments in the V-H-V-H-V sequence.

If |dx|>1 and dy>1, a two-segment connecting line is possible in the V-H sequence. If the vertical part of the path has an obstacle, but the horizontal path is free, the connecting line is the three-segment H-V-H. If the horizontal part of the path has an obstacle, but the horizontal path is free, the connecting line is the three-segment V-H-V. If both parts of the path have obstacles, a four-segment sequence is attempted.

Finally, if |dx|>1 and dy<0, the connecting line has a minimum of four segements, the construction of which should now be evident.

3 Logic Diagram Generation

Using the information stored in the graphical database, the workstation generates the logic diagram on a user-specified graphical output device. The invention provides the user the opportunity to interactively edit the script and to compare different styles and page layouts of the same diagram. To aid the user, the invention includes the following capabilities:

1. Logical simulation to check correctness of the script.
2. Layout simulation to check a variety of publishing features, including style, pagination, page orientation, page margins, size and shapes of symbols, different fonts and so on.
3. Animation, illustrating the logical interactions.

The present invention employs methods to make the logic program customizable.

Ways in which the final appearance of the diagram can be modified include the following:

1. The diagram can be presented in portrait (vertical) or landscape (horizontal) orientation.

2. The diagram can be rearranged in various different styles.
3. The output symbols size may vary.
4. The output symbols may have a drop shadow added.
5. The output symbols may be reassigned to different script symbols.
6. The text size may vary.

Figure 3:
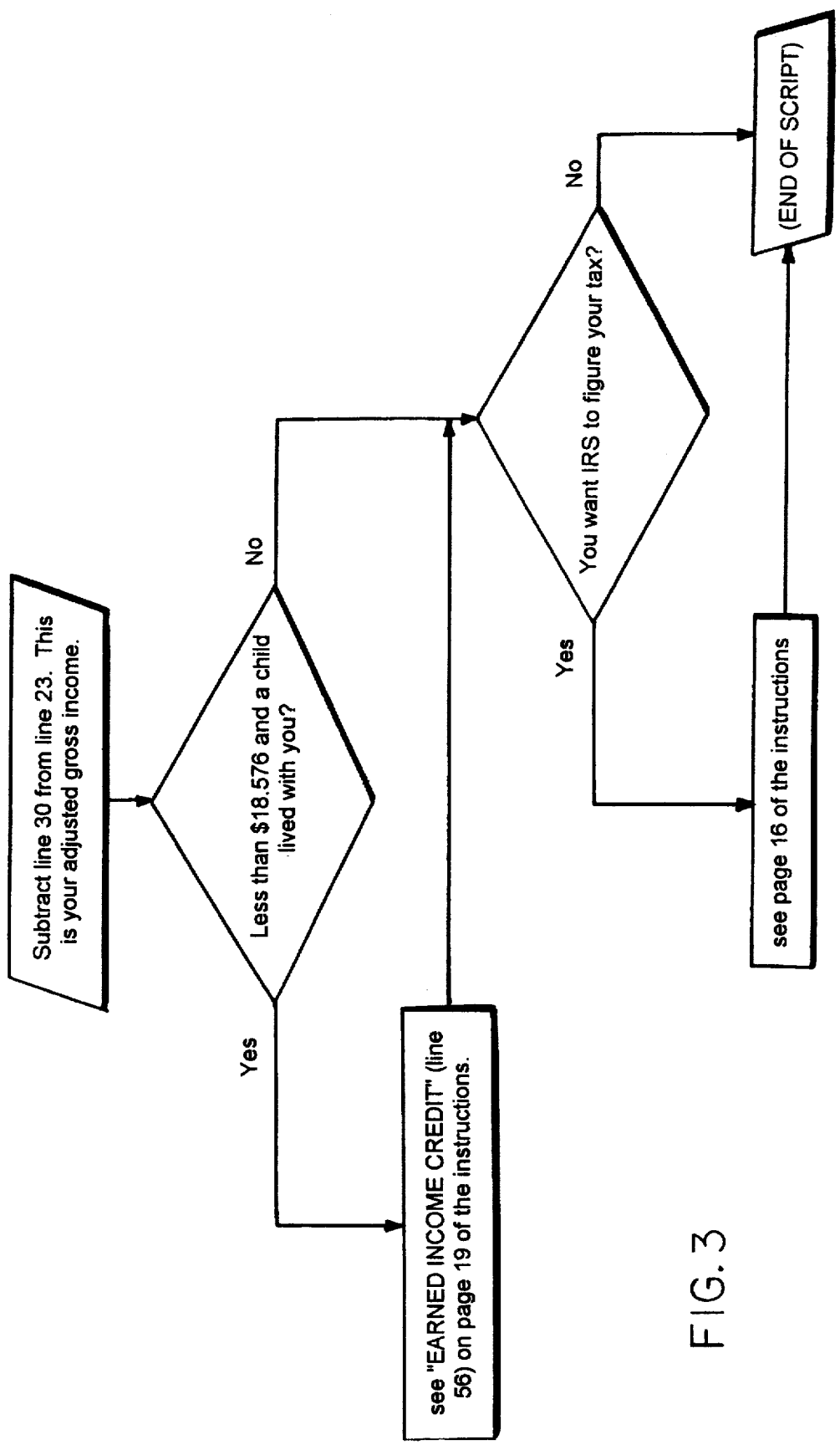
FIG. 3 is a flow chart generated using the present invention.
Figure 4:
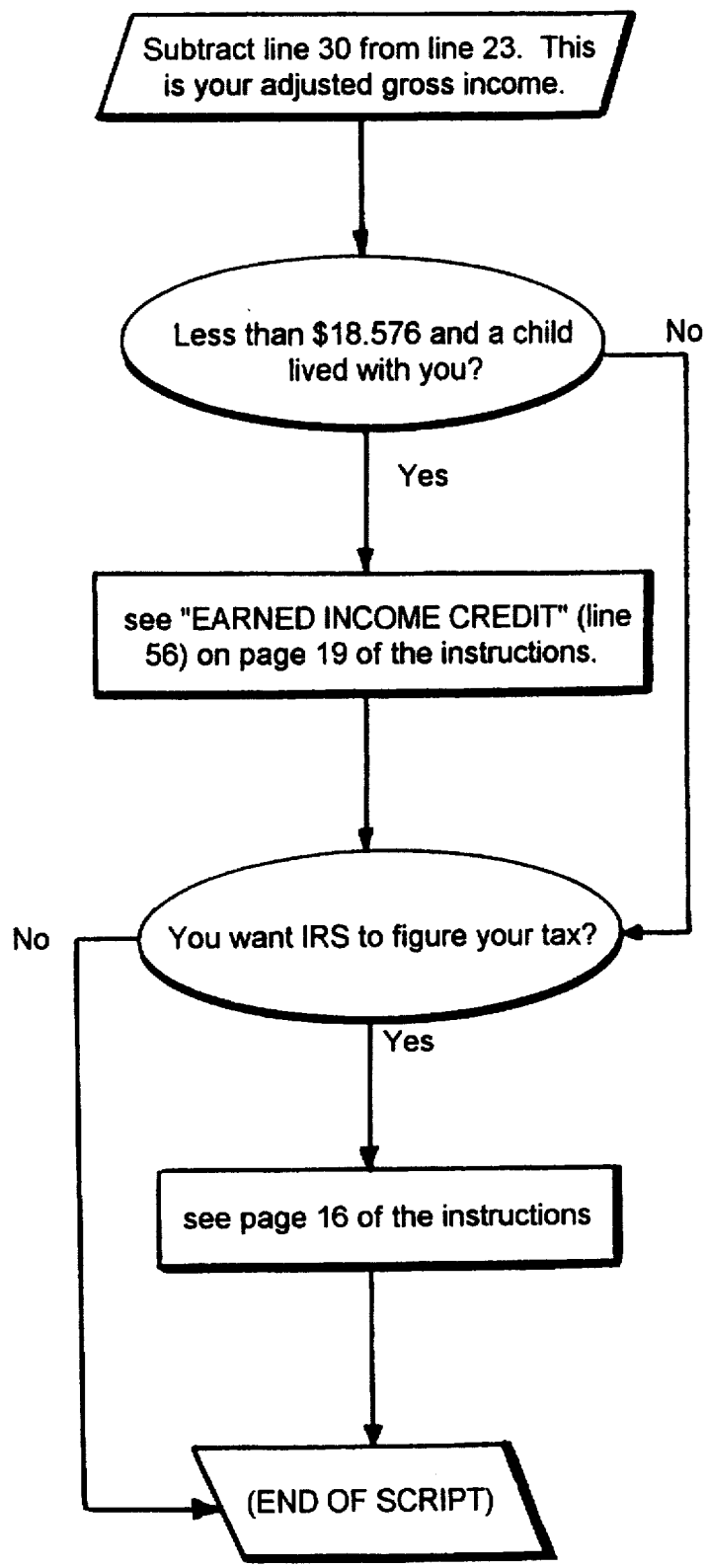
FIG. 4 is a variation of the flow chart of FIG. 3 generated using the present invention.

FIG. 4 shows a flow chart generated from the same script as that in FIG. 3 to illustrate the versatility of the invention.

If a logic diagram is too large to fit on one page, the invention is able to automatically split the diagram into as many pages as necessary. The interconnections between symbols on different pages are clearly marked. These separate pages can then be bound together in book form of pasted side by side to create a poster size diagram.

Computer programs for logic diagram generation which use graphical methods similar to those described hereinabove are the programs of the CLEAR+™ line, products of CLEAR Software, Inc. of Brookline, Mass. These products produce computer-generated flow charts of computer code in the C or dBASE languages.

Portions of the disclosure of this patent application, including the appendix, contain material which is subject to copyright protection and as to which copyright is claimed. The copyright owner has no objection to the facsimile reproduction by anyone of the patent document as it appears in the Patent and Trademark office files, but otherwise reserves all copyright rights whatsoever.

It is recognized that modifications and variations of the present invention will occur to those skilled in the art, and it is intended that all such modifications and variations be included within the scope of the claims.

– 13 –

Appendix

Syntax Summary

| ClearScript Command | Script Symbol | Sample Script Lines |
|---|---|---|
| Case Begin | : | Select one of the following: |
| Case Choice | ( ) | (First Choice) |
|  |  | (Second Choice) |
| Case End | :end | :end |
| Comment | { } | {This note will not affect the Logic Diagram} |
| If Begin | ? | More work to be done? |
|  |  | Go back to start of job. StepOne> |
| If Choice | ( ) | () |
|  |  | Job is complete! |
| If End | ?end | ?end |
| Goto | LabelName> | End> |
| Label | LabelName- | End- |
| Loop Begin | ; | Keep working until done; |
| Loop End | ;end | ;end |
| Output Line | \| | First output line\|Second output line. |
| Output Text | [ ] | This text will [This will appear] not appear. |
| Include | ProcedureName# | Job1# |
| Procedure Begin | ProcedureName= | Job1= |
|  |  | This Script line will be used in place of a Job1 include. |
| Procedure End | =end | =end |
| Statement | . | This is the simplest line of all. |
| Stop | ! | Finished early! |
| Tree Begin | \ | Main Level\ |
|  |  | Sub level1. |
| Tree End | \end | \end |

Command Reference

Automatic Title

Script Rules

The first line of a Script is automatically printed as a title centered at the top of the Logic Diagram. If the first Script Line is blank, no title is printed on the Logic Diagram.

Logic Diagram Result

Script Symbols are ignored in the first Script Line; other than the Title produced, this Script Line has no affect on the Logic Diagram.

Case

The Case structure creates a multiple branching point on a Logic Diagram; it opens with a Case Begin, has at least one Choice, and closes with a Case End.

Case Begin

Script Symbol :

Script Rules

The Script Symbol must be at the end of the Script Line.

Logic Diagram Result

One Output Symbol is created with a separate Output Line leaving it for each Choice; any text found on the Script Line is placed within the Output Symbol.

Case Choice

Script Symbol ( )

Script Rules

The Script Symbol must be at the start of the Script Line.

One or more Choices are allowed in a Case.

Other Script Symbols may follow a Choice on the same Script Line.

Any number of Script Lines may follow each Choice.

Logic Diagram Result

Each Choice creates an Output Line which leaves the Case Begin Output Symbol.

If text is found within the Script Symbol, an Output Symbol is created, and the text is placed within it.

Output Symbols for Script Lines between each Choice are all placed on the same Output Line.

Case End

Script Symbol :end

Script Rules

The Script Symbol must be placed on its own Script Line.

Logic Diagram Result

No Output Symbol is created for the Case End.

All of the Output Lines created for the Choices stop at the first Output Symbol after the Case End.

Comment

A Comment is used to add documentation for the reader of a Script, and to mark off sections of a Script that should not be included in the Logic Diagram.

Script Symbol { }

Script Rules

Comments can be placed within a Script Line.

Comments can include multiple Script Lines.

Logic Diagram Result

Anything within the Comment Script Symbols is ignored when the Logic Diagram is created.

If

The basic format of the If structure is a Yes/No question, which creates a two-way branching point on the Logic Diagram. The If opens with an If Begin and closes with an If End; between these two Script Lines there may be from zero to two Choices.

If Begin

Script Symbol ?

Script Rules

The Script Symbol must be at the end of the Script Line.

Logic Diagram Result

An Output Symbol is created with two Output Lines leaving it; any text found on the Script Line is placed within the Output Symbol.

By default, the word Yes is placed above one Output Line and No is placed above the other.

If Choice

Script Symbol ( )

Script Rules

The Script Symbol must be at the start of the Script Line.

From zero to two Choices are allowed within an If structure.

Other Script Symbols may follow a Choice on the same Script Line.

Any number of Script Lines may follow each Choice.

Logic Diagram Result

The purpose of the Choice is to create two groups of Script Lines within the If structure. Unlike the Case Choice, an If Choice does not create an Output Symbol of its own.

The first 5 characters of any text within the Script Symbol is used on the Logic Diagram in place of the word Yes, and the first 5 characters of any text found within the second Choice Script Symbol replaces the word No.

The Output Symbols for the first group of Script Lines are placed along the Yes Output Line, and Output Symbols for the second group of Script Lines are placed along the No Output Line.

If End

Script Symbol ?end

Script Rules

The Script Symbol must be placed on its own Script Line.

Logic Diagram Result

No Output Symbol is created for the If End.

The Yes and No Output Lines stop at the first Output Symbol after the If End.

Possible If Formats

No Choices

All of the Script Lines found between the If Begin and If End are used to create Output Symbols on the Yes Output Line only.

One Choice

Output Symbols for Script Lines found before the Choice are placed on the Yes Output Line, and Output Symbols for Script Lines found after the Choice are placed on the No Output Line.

Two Choices

Script Lines following the first Choice are used to create the Output Symbols on the Yes Output Line, and Script Lines following the second Choice are placed on the No Output Line.

Label

Labels are used to draw a line from one Output Symbol to another.

Label names may be up to 30 characters long, and may not contain spaces. Upper or lower case Label names are treatedly identically.

Goto

Script Symbol   LabelName>

Script Rules

The Script Symbol must be placed at the end of a Script Line.

For every Goto there must be a matching Label in the same Script.

There may be any number of Gotos for a single Label.

Gotos are not allowed within Procedures and Tree structures.

Logic Diagram Result

The Goto causes an Output Line to be drawn from the Output Symbol before the Goto to the Output Symbol after the Label.

No Output Symbol is created for the Goto, and the Label name within the Goto is not displayed on the Logic Diagram.

Label

Script Symbol   LabelName-

Script Rules

The Script Symbol must be placed at the end of a Script Line.

Duplicate labels with the same name are forbidden.

Labels are not allowed within Procedures and Tree structures.

A Label does not have to have a matching Goto.

Logic Diagram Result

The Output Line created by the Goto ends at the Ouput Symbol after the Label.

No Output Symbol is created for the Label, and the Label name is not displayed on the Logic Diagram.

Loop

A Loop is used to represent a repetive set of steps on a Logic Diagram. It opens with a Loop Begin and closes with a Loop End, and it can have any number of Script Lines between the two.

Loop Begin

Script Symbol  ;

Script Rules

The Script Symbol must be placed at the end of a Script Line.

Logic Diagram Result

The Loop Begin creates an Output Symbol with two Output Lines leaving it. One Output Line is labeled with the word No, and ends at the Output Symbol after the Loop End; the other Output Line is labeled Yes, and ends at the Output Symbol after the Loop Begin.

Any text on the Script Line appears in the Output Symbol.

Output Symbols for Script Lines between the Loop Begin and Loop End are placed along the Yes Output Line.

Loop End

Script Symbol  ;end

Script Rules

The Script Symbol must be placed on its own Script Line.

Logic Diagram Result

The Loop End does not create an Output Symbol, but it does draw an Output Line from the last Output Symbol in the Loop back to the Loop Begin Output Symbol

Output Symbol Text

The ClearScript language provides two methods of controlling the appearance of text within an Output Symbol. The Output Line splits the text in an Output Symbol into multiple lines, and the Output Text allows selective parts of a Script Line to be placed in the Output Symbol.

Output Line

Script Symbol  |

Script Rules

The Script Symbol can be placed anywhere within a Script Line, and may be repeated any number of times within a Script Line.

Logic Diagram Result

The Output Line breaks the text within an Output Symbol onto a new display line.

Output Text

Script Symbol  [ ]

Script Rules

The Script Symbol can be placed anywhere within a Script Line, and may be repeated any number of times within a Script Line.

Logic Diagram Result

Only the text within this Script Symbol appears in the Output Symbol.

Several Output Text Script Symbols can be placed in a single Script Line, allowing individual pieces of the Script Line to be displayed.

Procedure

Procedures allow commonly used Script Lines to be repeated in several different Scripts, or in several places in a single Script.

A Procedure has two basic components: a Procedure Definition, which assigns a specific name to any number of Script Lines; and an Include, which is replaced in the Logic Diagram with the Output Symbols found in the Procedure Definition.

Procedures don't create Output Symbols or Lines of their own. The Logic Diagram is the same whether the Output Symbols come from Script Lines physically written into a part of a Script or Script Lines substituted by an Include.

Procedure Names

Procedure names must conform to the naming rules for text files in the Computer Operating System under which ClearScript is running; this makes it possible for individual procedures to be stored in separate text files.

– 17 –

Procedure Definitions

A Procedure Definition is a Block Structure which opens with a Procedure Begin, contains any number of Script Lines, and closes with a Procedure End.

A Procedure Definition may be placed at the end of a Script, in which case it may only be followed by other Procedure Definitions, or it may be placed in a separate Script File with a file name the same as the Procedure name.

A Procedure Definition cannot be nested within another Procedure Definition, or any other Block Structure.

The definition of Procedures with duplicate names is not allowed in the same Script.

Procedure Begin

Script Symbol  ProcedureName=

Script Rules

The Script Symbol must be placed on its own Script Line.

Any number of Script Lines can follow a Procedure Begin.

Logic Diagram Result

The Procedure Begin does not affect the Logic Diagram directly.

Procedure End

Script Symbol  =end

Script Rules

The Script Symbol must be placed on its own Script Line.

Include

Script Symbol  ProcedureName#

Script Rules

The Script Symbol must be placed on its own Script Line.

An Include may be repeated any number of times for a Procedure in the same Script.

When an Include is found in a Script, the current Script is searched for a matching Procedure Definition. If the definition cannot be found within the Script, the current disk directory is then searched for a matching Script file which contains a matching Procedure Definition.

Logic Diagram Result

The Include does not affect the Logic Diagram directly, but the Script Lines found within the Procedure definition are represented on the Logic Diagram at the point of the Include.

Statement

The Statement is the basic building block of a Script. It represents a single step or detail and is shown on a Logic Diagram as an Output Symbol strung along the current Output Line.

Script Symbol  .

Script Rules

The Script Symbol must be at the end of the Script Line.

Logic Diagram Result

The first Statement in a Script has its own Output Symbol, which is placed at the top of the Logic Diagram, with one Output Line leaving it.

A Statement between the beginning and end of a Script has a different Output Symbol, which also has one Output Line leaving it.

The last Statement in a Script has a third type of Output Symbol with no Output Lines leaving it.

Any text found on the Script Line of a Statement is placed within the Output Symbol.

If the last Script Symbol in a Script is not a Statement, a Last Statement Output Symbol is automatically placed on the Logic Diagram at the end of the main Output Line. The words End of Script are automatically placed within this Output Symbol.

Stop

The Stop is used to depict an ending or exit point on a Logic Diagram.

Script Symbol  !

Script Rules

The Script Symbol must be at the end of the Script Line.

A Script may have any number of Stops.

A Stop is not needed at the end of a Script.

Logic Diagram Result

An Output Symbol is created with no Output Lines leaving it; any text found on the Script Line is placed within it.

Tree

The Tree structure produces a visual Tree Chart, often called an Organizational Chart, on the Logic Diagram.

Tree Begin

Script Symbol  \

Script Rules

The Script Symbol must be at the end of the Script Line.

Any number of Script Lines may be placed between a Tree Begin and Tree End. The only exception is a Goto or a Label, both of which are not allowed within Tree structures.

One Tree structure may be nested within another.

Logic Diagram Result

An Output Symbol is created for the Tree Begin, with an Output Line leading to the Output Symbol for each Statement, Stop, or Block Structure found between the Tree Begin and Tree End.

Any text found on the Tree Begin Script Line is placed in the Output Symbol.

Tree End

Script Symbol  \end

Script Rules

The Script Symbol must be placed on its own Script Line.

The Tree End marks the end of the Script Lines belonging to the current Tree Structure.

Logic Diagram Result

The Tree End does not create an Output Symbol or Output Line.

We claim:

1. A computer-based workstation for generating logic diagrams from a script corresponding to a text written in a natural language, said workstation comprising:

a computing apparatus having at least one central processing unit and at least one block of memory, an input unit or units connected to said computing apparatus for providing input of said script to said computing apparatus, programs running in said computing apparatus which recognize script symbols in said script, generate from said script a graphical database containing shape and placement information of output symbols and connecting lines of said logic diagrams, determine within said graphical database from a set of predetermined rules a minimum total line length of each said connecting lines.

determine from said set of predetermined rules a minimum number of segments of said connecting lines, and responsive to said placement information of said output symbols placement information of said connecting lines, said minimum total line length, and said minimum number of segments, minimize connecting line intersection and connecting line ambiguity within said graphical database, and generate from said graphical database logic diagrams corresponding to said script, and an output unit or units connected to said computing apparatus for providing visual display of logic diagrams.

2. A computer-based workstation for generating logic diagrams from a script corresponding to a text written in a natural language, said text being structured according to a structural language, comprising:

a computing apparatus having at least one central processing unit and at least one block of memory, an input unit or units connected to said computing apparatus for providing input of said script to said computing apparatus, programs running in said computing apparatus which recognize script symbols in said script, generate from said script a graphical database containing shape and placement information of output symbols and connecting lines of said logic diagrams, determine within said graphical database from a set of predetermined rules a minimum total line length of each of said connecting lines, determine from said set of predetermined rules a minimum number of segments of said connecting lines, and responsive to said placement information of said output symbols, said placement information of said connecting lines, said minimum total line length, and said minimum number of segments, minimize connecting line intersection and connecting line ambiguity within said graphical database, and generate from said graphical database logic diagrams corresponding to said script, and an output unit or units connected to said computing apparatus for providing visual display of logic diagrams.

3. The computer-based workstation of claims 1 or 2 wherein programs running in said computing apparatus provide text-editing capability in conjunction with said input output units, whereby a source text can be entered and edited and whereby script symbols can be added to and edited in said source text, the resulting altered text forming a script.

4. The computer-based workstation of claims 1 or 2 wherein programs running in said computing apparatus allow interactive editing of said logic diagrams.

5. The computer-based workstation of claims 1 or 2 wherein said script symbols are icons representing corresponding output symbols.

\* \* \* \* \*

UNITED STATES PATENT AND TRADEMARK OFFICE
CERTIFICATE OF CORRECTION

PATENT NO. : 5,617,578

DATED : April 1, 1997

INVENTOR(S) : Yury Kroll, Vadim M. Yasinovsky and Adam B. Green

It is certified that error appears in the above-indentified patent and that said Letters Patent is hereby corrected as shown below:

Column 3, line 22: please delete "repitition"; and insert --repetition-- therefor.

Column 23, line 17: after "each", please insert --of-- therefor.

Column 23, line 17, please delete "."; and insert --,-- therefor.

Column 23, line 22: after "symbols", please insert --, said-- therefor.

Signed and Sealed this

Eighth Day of July, 1997

Attest:

BRUCE LEHMAN

*Attesting Officer*  Commissioner of Patents and Trademarks